United States Patent
Hall (10) Patent No.: US 10,592,580 B2
(45) Date of Patent: Mar. 17, 2020

(54) WEB UI BUILDER APPLICATION

(71) Applicant: Christopher Michael Hall, San Jose, CA (US)

(72) Inventor: Christopher Michael Hall, San Jose, CA (US)

(73) Assignee: eBay Inc., San Jose, CA (US)

( * ) Notice: Subject to any disclaimer, the term of this patent is extended or adjusted under 35 U.S.C. 154(b) by 428 days.

(21) Appl. No.: 14/262,418

(22) Filed: Apr. 25, 2014

(65) Prior Publication Data

US 2015/0310122 A1  Oct. 29, 2015

(51) Int. Cl.
*G06F 17/00* (2019.01)
*G06F 16/958* (2019.01)
*G06F 17/21* (2006.01)

(52) U.S. Cl.
CPC .......... *G06F 16/972* (2019.01); *G06F 16/958* (2019.01); *G06F 17/212* (2013.01)

(58) Field of Classification Search
CPC .... G06F 17/2247; G06F 8/138; G06F 3/0481; G06F 17/30893; G06F 17/212; G06F 17/3089; G06F 8/38; G06F 16/972; G06F 16/958; H04N 21/2743; H04N 21/4223; H04N 7/17336; G06T 19/006; G06T 2215/16; G06Q 10/00
USPC ................................................. 715/234, 762
See application file for complete search history.

(56) References Cited

U.S. PATENT DOCUMENTS 6,031,531 A * 2/2000 Kimble ............... G06F 3/04812 340/4.1
8,650,503 B2 2/2014 Mihalcea
2006/0251338 A1* 11/2006 Gokturk ............ G06F 17/30253 382/305

(Continued)

FOREIGN PATENT DOCUMENTS

JP     2006092277 A    4/2006
WO   WO-2005038648 A1   4/2005
WO   WO-2015164463 A1   10/2015

OTHER PUBLICATIONS

"Application Serial No. PCT/US2015/027016 International Search Report dated Aug. 7, 2015", 3 pgs.

(Continued)

*Primary Examiner* — Jason T Edwards
(74) *Attorney, Agent, or Firm* — Schwegman Lundberg & Woessner, P.A.

(57) ABSTRACT

Systems and methods are presented for generating a webpage based on a physical mockup of the webpage. In some embodiments, a computer-implemented method is presented. The method may include accessing an image of a physical mockup of a webpage, the physical mockup of the webpage including one or more physical objects representative of one or more virtual objects in the webpage. The method may also include converting the image into the webpage, based on the physical mockup of the webpage, the webpage including the one or more virtual objects arranged in a layout corresponding to positions of the one or more physical objects in the physical mockup; and applying user-interactive functionality to the one or more virtual objects in the webpage, based on one or more visual indicators on the one or more physical objects identifiable in the image.

18 Claims, 8 Drawing Sheets

(56) References Cited

U.S. PATENT DOCUMENTS

| | | | | |
|---|---|---|---|---|
| 2007/0198939 A1* | 8/2007 | Gold | ............ | A63F 13/12 |
| | | | | 715/757 |
| 2008/0077872 A1* | 3/2008 | Zeevi | ............ | G06F 3/0481 |
| | | | | 715/762 |
| 2008/0222618 A1* | 9/2008 | Valtchev | ............ | G06F 9/4443 |
| | | | | 717/139 |
| 2009/0066690 A1* | 3/2009 | Harrison | ............ | G06T 19/006 |
| | | | | 345/419 |
| 2009/0138375 A1* | 5/2009 | Schwartz | ............ | G06Q 30/0601 |
| | | | | 705/26.1 |
| 2009/0161963 A1* | 6/2009 | Uusitalo | ............ | G06F 3/011 |
| | | | | 382/203 |
| 2011/0010645 A1* | 1/2011 | Mihalcea | ............ | G06F 8/38 |
| | | | | 715/762 |
| 2012/0151433 A1 | 6/2012 | Amodio et al. | | |
| 2012/0290913 A1* | 11/2012 | Benraz | ............ | G06F 9/4445 |
| | | | | 715/222 |
| 2012/0306853 A1* | 12/2012 | Wright | ............ | G06T 19/20 |
| | | | | 345/419 |
| 2013/0117656 A1 | 5/2013 | Verlaan et al. | | |
| 2013/0297998 A1* | 11/2013 | Devara | ............ | G06F 17/3089 |
| | | | | 715/205 |
| 2015/0185825 A1* | 7/2015 | Mullins | ............ | G06T 19/006 |
| | | | | 345/633 |

OTHER PUBLICATIONS

"Application Serial No. PCT/US2015/027016 Written Opinion dated Aug. 7, 2015", 5 pgs.

International Preliminary Report on Patentability received for PCT Patent Application No. PCT/US2015/027016, dated Nov. 3, 2016, 7 pages.

* cited by examiner

WEB UI BUILDER APPLICATION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2013, eBay Inc. All Rights Reserved.

TECHNICAL FIELD

The subject matter disclosed herein generally relates to webpage development. In some example embodiments, the present disclosures relate to systems and methods to facilitate webpage user interface (UI) applications.

BRIEF DESCRIPTION OF THE DRAWINGS

Some embodiments are illustrated by way of example and not limitation in the figures of the accompanying drawings.

DETAILED DESCRIPTION

Example methods, apparatuses and systems are presented for building webpages using physical mockups. In some example embodiments, the physical mockups may include pictures of content typical in the layout of a webpage, such as scroll bars, text boxes, etc. In some example embodiments, the physical mockups include objects and/or pictures that have little to no resemblance to content typical in a webpage layout, but serve as identifiable representations of said content recognizable according to aspects of the present disclosure.

In the digital age, webpage development has become vastly more commonplace. It is almost expected that any effort to advertise or make oneself known for any reason should have a website where users can visit to learn more information and/or make purchases. It is also desirable to build webpage that is customized and unique to the advertiser. In spite of its expected prevalence and assumed uniqueness, building webpages may oftentimes still demand a certain amount of programming expertise, or at least access to expensive software. Thus, it is desirable to create means for increased ease and access to building webpages.

In addition, as websites have become a main source of marketing and branding for individuals and companies, webpage development should become more collaborative, as it may be more strategic to receive inputs from multiple individuals to the layout and content of webpages. Using conventional methods, a single web developer typically controls most of the web page design, as only a single individual usually can work on a computer screen developing the web page. Thus, it is desirable to create means for developing web pages in a more collaborative fashion.

Aspects of the present disclosure discuss methods and systems for facilitating webpage user interface (UI) applications. In some example embodiments, a webpage UI application may be configured to access a recorded image or photo of a physical mockup of a webpage. The physical mockup may include, for example, paper cutouts of buttons, scroll bars, headers, text boxes, etc., and in general, various objects that may be seen or used in a webpage. In other cases, these various physical objects may be magnets, plastic cutouts, or any other kind of physical media that may be used to represent various virtual objects in a webpage. A user or multiple users may arrange the physical objects in an arrangement that may represent the layout envisioned for a webpage. An image recording device, such as a mobile device or digital camera, may then record the physical mockup of the webpage. An application according to aspects of the present disclosure may access the recorded image, and then may convert the recorded image having the physical mockup into a webpage having those physical objects now expressed in an actual webpage format. In this way, multiple users may easily rearrange and manipulate objects in a webpage. Converting a physical representation of the webpage into an actual digital webpage functionality may also allow for the design of the webpage to be accessed by multiple designers at the same time. In addition, aspects of the present disclosure may allow for a more intuitive process to designing a webpage. Moreover, aspects of the present disclosure may make webpage design more accessible to less experienced webpage developers. These and other disclosures will be described in more detail in the following descriptions.

Figure 1:
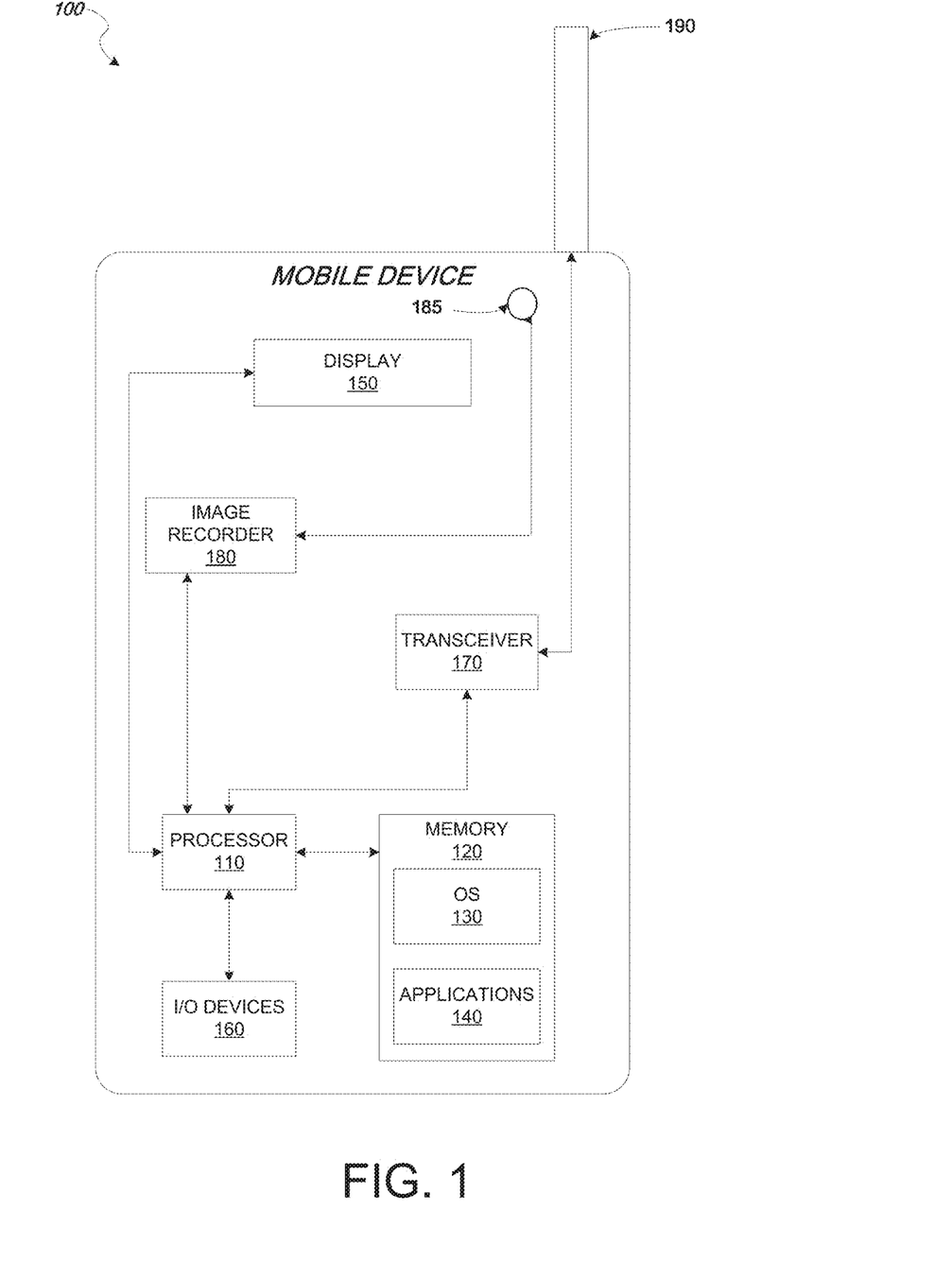
FIG. 1 is a mobile device suitable for recording images of a physical mockup of a webpage layout, and for generating an actual webpage based on the physical mockup, according to some example embodiments.

Referring to FIG. 1, a block diagram illustrating a mobile device 100 is presented, according to some example embodiments. The mobile device 100 may be configured to record images of physical objects representing virtual objects in a web page, as well as view images according to at least some example embodiments. The mobile device 100 may be configured to record images of a physical mockup of a web page. For example, camera lens 185 may be configured to record one or more images of various physical objects representing buttons, scroll bars, pictures, text boxes, etc., the camera lens 185 being controlled by image recorder 180. The mobile device 100 may alternatively or additionally be configured to view a recorded image of the physical mockup, as well as a digital conversion of the physical mockup as an actual webpage with appropriate functionality based on the representations of the physical objects. For example, display 150 may be configured to display the recorded image of the physical webpage mockup, and/or display a functioning webpage based on the digital conversion of the physical mockup. The mobile device 100 may include a processor 110. The processor 110 may be any of a variety of different types of commercially available processors suitable for mobile devices (e.g., an XScale architecture microprocessor, a Microprocessor without Interlocked Pipeline Stages (MIPS) architecture processor, or another type of processor). The processor 110 may be configured to convert the image having the physical webpage mockup into a functioning webpage based on the layout shown according to the physical mockup. A memory 120, such as a random access memory (RAM), a Flash memory, or other type of memory, is typically accessible to the processor 110. The memory 120 may be adapted to store an operating system (OS) 130, as well as application programs 140, such as a mobile application for converting an image of a physical webpage mockup into a functioning webpage. The processor 110 may be coupled, either directly or via appropriate intermediary hardware, to a display 150 and to one or more input/output (I/O) devices 160, such as a keypad, a touch panel sensor, a microphone, and the like. Similarly, in some embodiments, the processor 110 may be coupled to a transceiver 170 that interfaces with an antenna 190. The transceiver 170 may be configured to both transmit and receive cellular network signals, wireless data signals, or other types of signals via the antenna 190, depending on the nature of the mobile device 100. In this manner, a connection with a network such as network 204 of FIG. 2, discussed more below, may be established.

Figure 2:
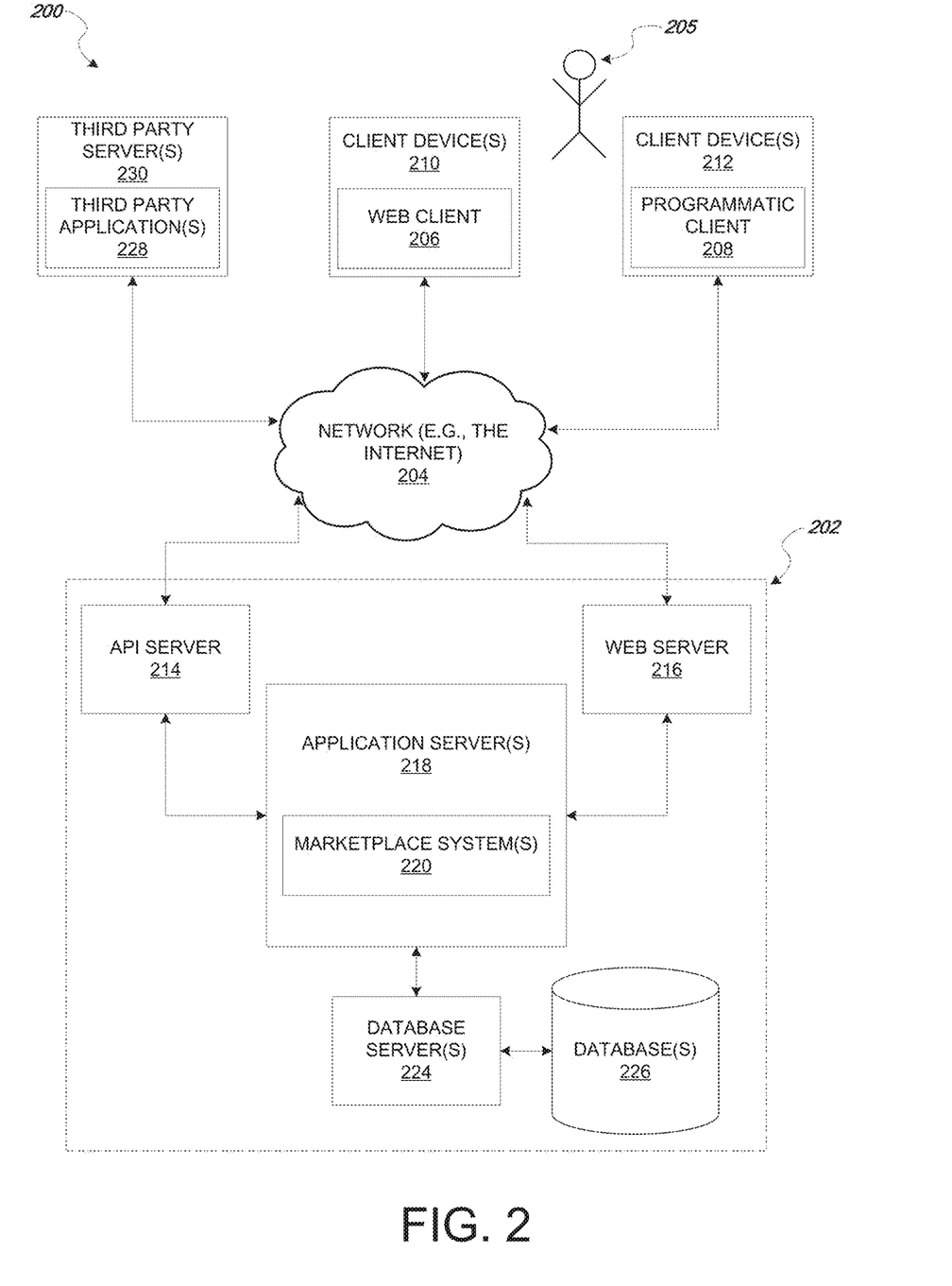
FIG. 2 is a network architecture suitable for storing images of a physical mockup of a webpage layout, and for generating and/or transmitting an actual webpage based on the physical mockup, according to some example embodiments.

Referring to FIG. 2, a high-level client-server-based network architecture 200 is shown, according to some example embodiments. The network architecture 200 may include systems, applications, modules, and/or other means for utilizing aspects of the present disclosures, as may be apparent to those with skill in the art. For example, the network architecture 200 may include means for accessing one or more images of a physical mockup of a webpage, and for converting the image of the physical mockup into a functioning webpage, according to aspects of the present disclosure. The network architecture 200 may also be configured to transmit the functioning webpage to one or more user devices. In other cases, the network architecture 200 may be configured to transmit one or more images of the physical mockup to one or more user devices. In some example embodiments, a networked system 202 may facilitate a network-based marketplace or payment system 220, providing server-side functionality via a network 204 (e.g., the Internet or wide area network (WAN)) to one or more client devices 210 and 212. FIG. 2 illustrates, for example, a web client 206 (e.g., a browser, such as the Internet Explorer® browser developed by Microsoft®), and a programmatic client 208 executing on respective client devices 210 and 212. The network-based marketplace system 220 may include a website or other central repository for storing and displaying the images of the physical mockups.

Examples of client devices 210 and 212 may include, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 202. Example client devices 210 and 212 may be consistent with the mobile device 100 described in FIG. 1. In some embodiments, the client device 210 may comprise a display module (not shown) to display information (e.g., in the form of user interfaces) and images. In further embodiments, the client device 210 may comprise one or more of touch screens, accelerometers, gyroscopes, cameras, microphones, global positioning system (GPS) devices, and so forth. In some examples embodiments, the networked system 202 is a network-based marketplace that responds to requests for product listings, publishes publications comprising item listings of products available on the network-based marketplace, and manages payments for these marketplace transactions. The product listings may include one or more images of the one or more various products. The images may include one or more composite images of a product as described herein. One or more users 205 may be a person, a machine, or other means of interacting with client devices 210 and 212. In embodiments, the user 205 is not part of the network architecture 200, but may interact with the network architecture 200 via client devices 210 and 212 or another means.

An application program interface (API) server 214 and a web server 216 may be coupled to, and provide programmatic and web interfaces respectively to, one or more application servers 218. The application servers 218 may host one or more marketplace systems 220, which may comprise one or more modules or applications and which may be embodied as hardware, software, firmware, or any combination thereof. The application servers 218 are, in turn, shown to be coupled to one or more database servers 224 that facilitate access to one or more information storage repositories or database(s) 226. In some example embodiments, the databases 226 are storage devices that store information to be posted (e.g., publications or listings, images of products, etc.) to the marketplace system 220. The databases 226 may also store digital goods information in accordance with example embodiments.

The marketplace system(s) 220 may provide a number of marketplace functions and services to users 205 that access the networked system 202. While the marketplace system(s) 220 is shown in FIG. 2 to form part of the networked system 202, it will be appreciated that, in alternative embodiments, the marketplace system(s) 220 may form part of a payment service that is separate and distinct from the networked system 202.

Further, while the client-server-based network architecture 200 shown in FIG. 2 employs a client-server architecture, the present inventive subject matter is of course not limited to such an architecture, and may equally well find application in a distributed, or peer-to-peer, architecture system, for example. The various marketplace system(s) 220 may also be implemented as standalone software programs, which do not necessarily have networking capabilities.

The web client 206 accesses the various marketplace system(s) 220 via the web interface supported by the web server 216. Similarly, the programmatic client 208 accesses the various services and functions provided by the marketplace system(s) 220 via the programmatic interface provided by the API server 214. The programmatic client 208 may, for example, be a seller application (e.g., the Turbo Lister application developed by eBay® Inc.) to enable sellers to author and manage listings on the networked system 202 in an off-line manner, and to perform batch-mode communications between the programmatic client 208 and the networked system 202.

Additionally, a third party application(s) 228, executing on a third party server(s) 230, is shown as having programmatic access to the networked system 202 via the programmatic interface provided by the API server 214. For example, the third party application 228, utilizing information retrieved from the networked system 202, may support one or more features or functions on a website hosted by the third party. The third party website may, for example, provide one or more promotional, marketplace, or payment functions that are supported by the relevant applications of the networked system 202. The third party server 230 may help proliferate the display of examples of functioning webpages based on images having a physical mockup of the webpage and according to the present disclosures through, for example, advertising an application used to facilitate this process.

Figure 3:
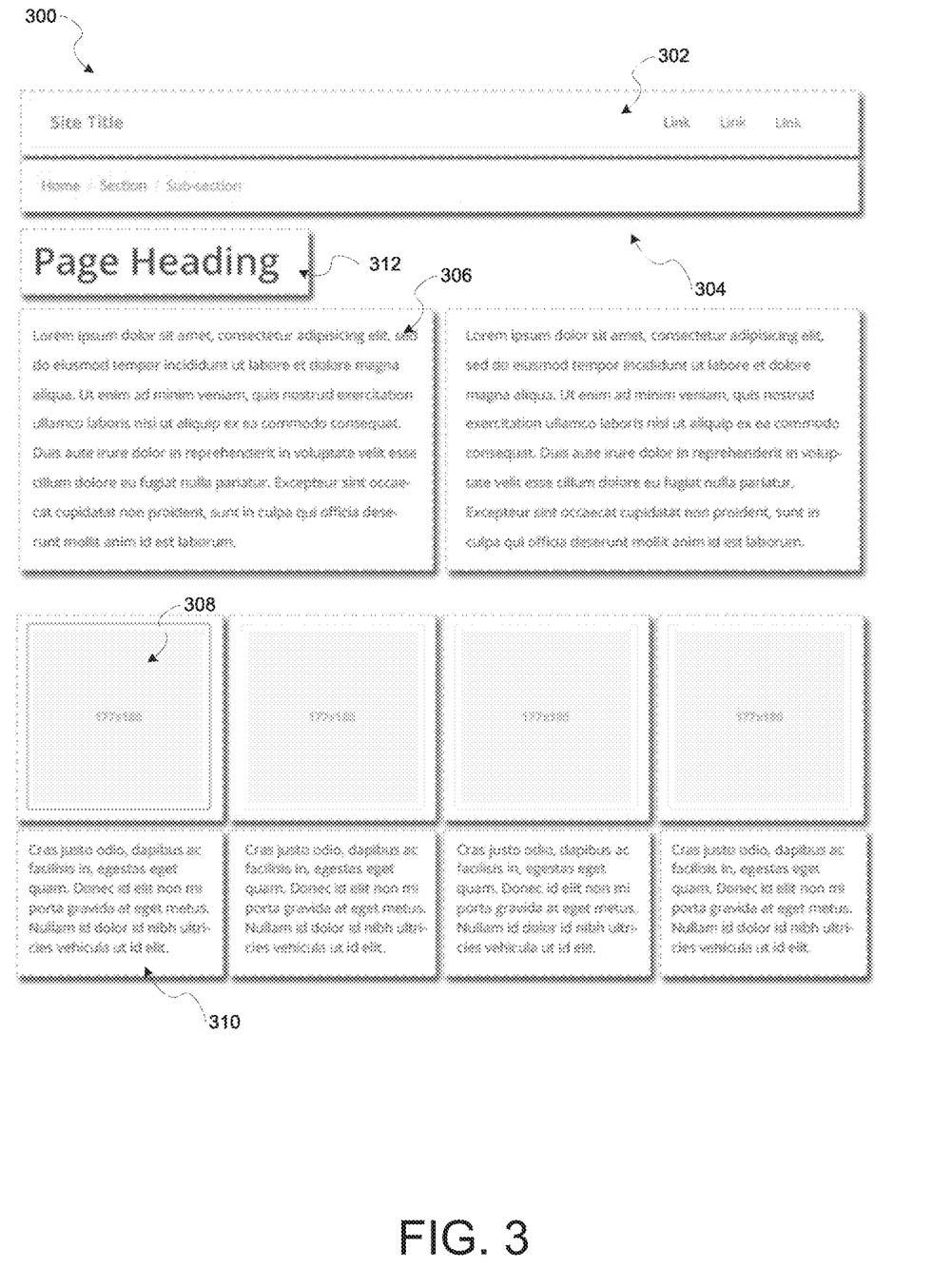
FIG. 3 is an example physical mockup of a webpage, used in some example embodiments.

Referring to FIG. 3, image 300 may represent an example layout of a physical webpage mockup according to some aspects of the present disclosure. Here, the various boxes with dashed lines may each represent a physical cutout of various objects commonly seen in a webpage. For example, title bar 302 may be simply a paper cutout with the word "Site Title," and "Link," printed on the piece of paper. As another example, subsection header 304 may also be simply another paper cutout with the words "Home," "Section," and "Sub-section." Various text boxes, such as text box 306 and text box 310, for example, may also be included in the physical webpage mockup. These boxes 306 and 310 may also be simply paper cutouts, in some example embodiments. In addition, image boxes, such as image box 308, may also be included. A page heading box 312 may also be included, along with many other types of objects contained in a webpage, not shown. A webpage developer may physically manipulate any or all of these physical cutouts into an arrangement that may represent the visual representation of how the developer would like the actual digital layout of a webpage to look like. For example, a developer might remove one of the four image boxes 308, feeling like the layout is too cluttered. The user may also rearrange the texts such that the text boxes 306 may be below the smaller text boxes 310 and the image boxes 308, and the smaller text boxes 310 may be moved up the webpage layout. Certainly, these are merely examples of how a user may manipulate the physical cutouts of the various webpage objects, and embodiments are not so limited.

While the physical objects of a webpage mockup were described in FIG. 3 as being simply paper cutouts of virtual webpage objects, other physical media may be used, and embodiments are not so limited. For example, instead of paper cutouts, each of the objects to be manipulated may be in the form of magnets, and a physical mockup of a webpage may be designed on a magnet board, a magnetic whiteboard, and the like. For example, a team of web developers may gather in a meeting room with a large whiteboard. One or more of the team members may then be able to physically manipulate the various magnets representing various objects of the webpage on the large whiteboard.

Figure 4:
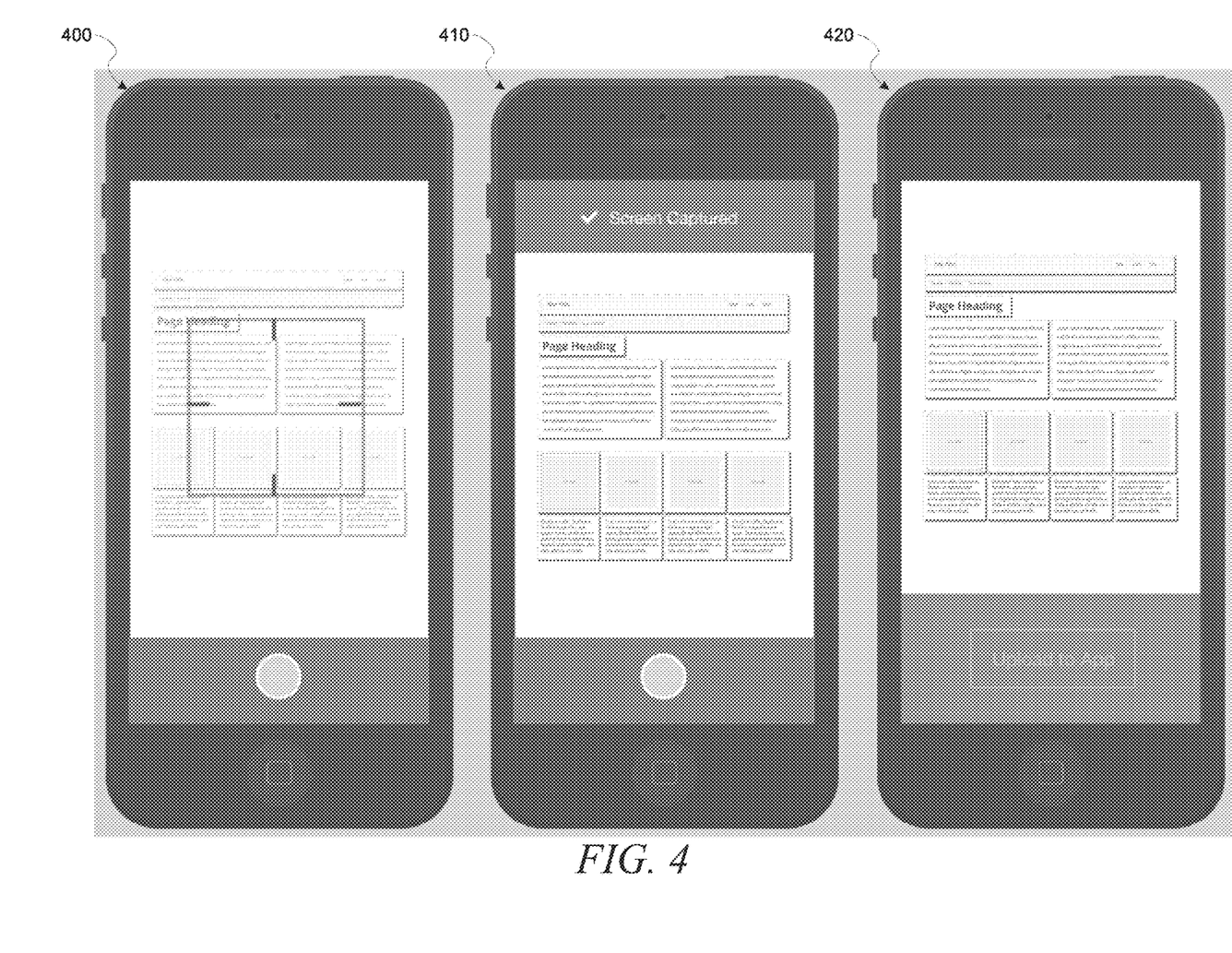
FIG. 4 is an example set of screen displays on a mobile device according to some example embodiments.

Referring to FIG. 4, example screen captures 400, 410, and 420 may illustrate part of a continued process according to various aspects of the present disclosure. For example, having confirmed a layout of a webpage using the physical objects discussed in FIG. 3, the physical layout may then be recorded by an image recording device, such as mobile device 100, the recording as shown in image 400. An example of the captured image may be as shown in screenshot 410. In some example embodiments, the image of the physical layout may be uploaded to an application according to aspects of the present disclosure, an example as shown in screenshot 420. In other cases, an application according to aspects of the present disclosure may prompt the user to record an image of the physical layout of the webpage, at which point the user may then follow the prompt and record the image using mobile device 100.

Figure 5:
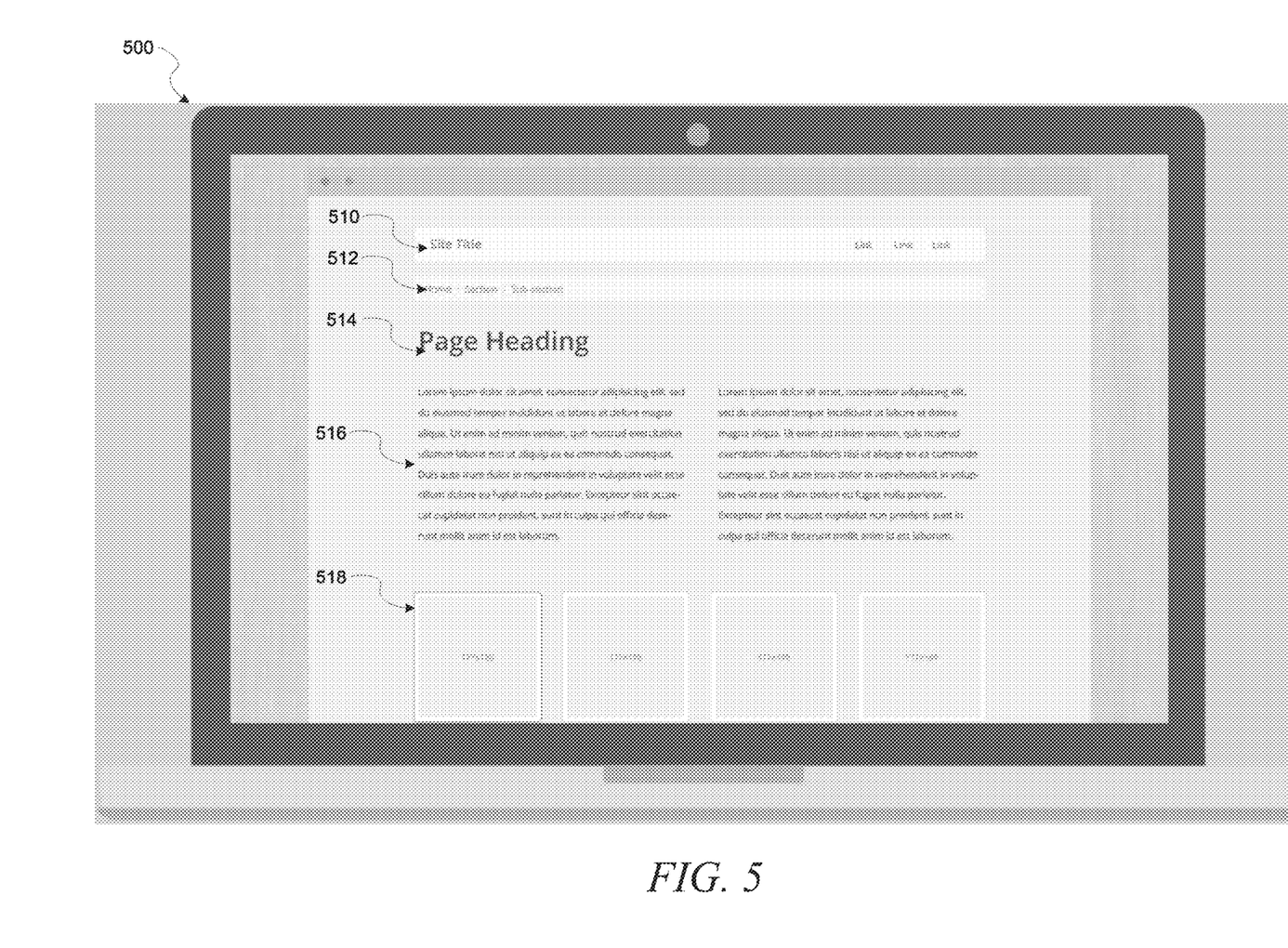
FIG. 5 illustrates an example conversion of a physical mockup to a virtual webpage according to some example embodiments.

Referring to FIG. 5, example screenshot 500 may illustrate further a continuation of the process according to various aspects of the present disclosure. For example, having uploaded the image of the physical layout of the webpage to an application according to aspects of the present disclosure, an actual webpage may then be generated based on the recorded image of the physical layout of the webpage. The application may possess means for recognizing objects in an image and associating them with various virtual objects in a webpage. For example, the webpage shown in screenshot 500 possesses a title bar 510, which may correspond to the physical mockup title bar 302. The subsection header 512 may correspond to the physical mockup subsection header 304, as shown in FIG. 3. The page heading object 514 may correspond to the physical markup page heading box 312. Similarly, the large text box 516 may correspond to the physical mockup large text box 306. Lastly, the image box 518 may correspond to the physical image box 308 in FIG. 3.

In some example embodiments, image recognition means according to aspects of the present disclosure may key off of certain distinguishing features about various physical mockup objects. For example, an application accessing an image of the physical mockup may recognize the phrase, "Site Title," and may understand that the object having that phrase should be converted into a title bar, such as title bar 510. As another example, the phrase, "Page Heading," may signal to the application to convert that object into a page header object, such as page heading object 514. As another example, a box with some amount of text or some key phrase, e.g., "text box," may signal to the application to convert that object into a text box, such as text box 516. As another example, a box with numbers indicating, for example, pixel dimensions, e.g., 180×250, may signal to the application to convert that object into an image box, such as image box 518. In some example embodiments, the application may be programmed to key off of various other indicators programmed by a user, and embodiments are not so limited. For example, the physical mockup objects may be color-coded. For example, a menu bar may be colored blue in the physical mockup, while image boxes may be colored green. An application according to aspects of the present disclosure may be programmed to recognize all blue boxes to be generated as menu bars, while all green boxes may be generated as image boxes, and so forth. In other cases, the color of objects may be sufficient for determining what virtual objects should be generated, regardless of the shape of the physical objects. Certainly other visual indicators or markers, like dashed lines, crisscrossed lines, chessboard patterns, particular numbers, symbols, or letters, or any unique visual indicator in general can be designated and/or programmed to be understood by aspects of the present disclosure to convert the physical object having those visual indicators into a particular object in a webpage. Example means for recognizing any or all of these example visual indicators may include functions based in OpenCV, MATLAB®, and AForge®, and other means apparent to those with skill in the art. For example, functions coded in OpenCV using concepts in Computer Vision image processing may be configured to detect certain key features in an image, such as markers, colors, or shapes. The features may then be extracted and matched to webpage objects having a specified functionality, such as a scroll bar function, radio button function, etc. The detected features may also be matched to specified shapes or graphics, such as a scroll bar having arrows at the ends, or a scroll bar having rounded edges at the end. The positions of the physical objects detected in the image may be matched to place the virtual webpage objects in corresponding positions in the webpage. Similar image processing techniques apparent to those of skill in the art can be used to convert the physical objects in an image to virtual objects in a webpage, and embodiments are not so limited.

As mentioned above, the various virtual objects generated in the webpage, based on the image or images of the physical mockup, may certainly also possess the desired functionality of the intended virtual objects. For example, an image box 518 generated according to aspects of the present disclosure, based on the image of the physical mockup, may be clicked on in the generated webpage, so that an image can be uploaded into that image box 518. Similarly, a text box 516 that is generated according to aspects of the present disclosure may be editable with various text. Similarly, a title bar 510 that is generated according to aspects of the present disclosure may be modified to include various drop-down menus and other pertinent information. Moreover, any scrollbars or buttons, not shown, may also have the desired functionality once generated according to aspects of the present disclosure. These are merely some examples of the many kinds of functionality possible, as persons of skill in the art would appreciate the many different kinds of functionality possible based on the present disclosure, and embodiments are not so limited.

Figure 6:
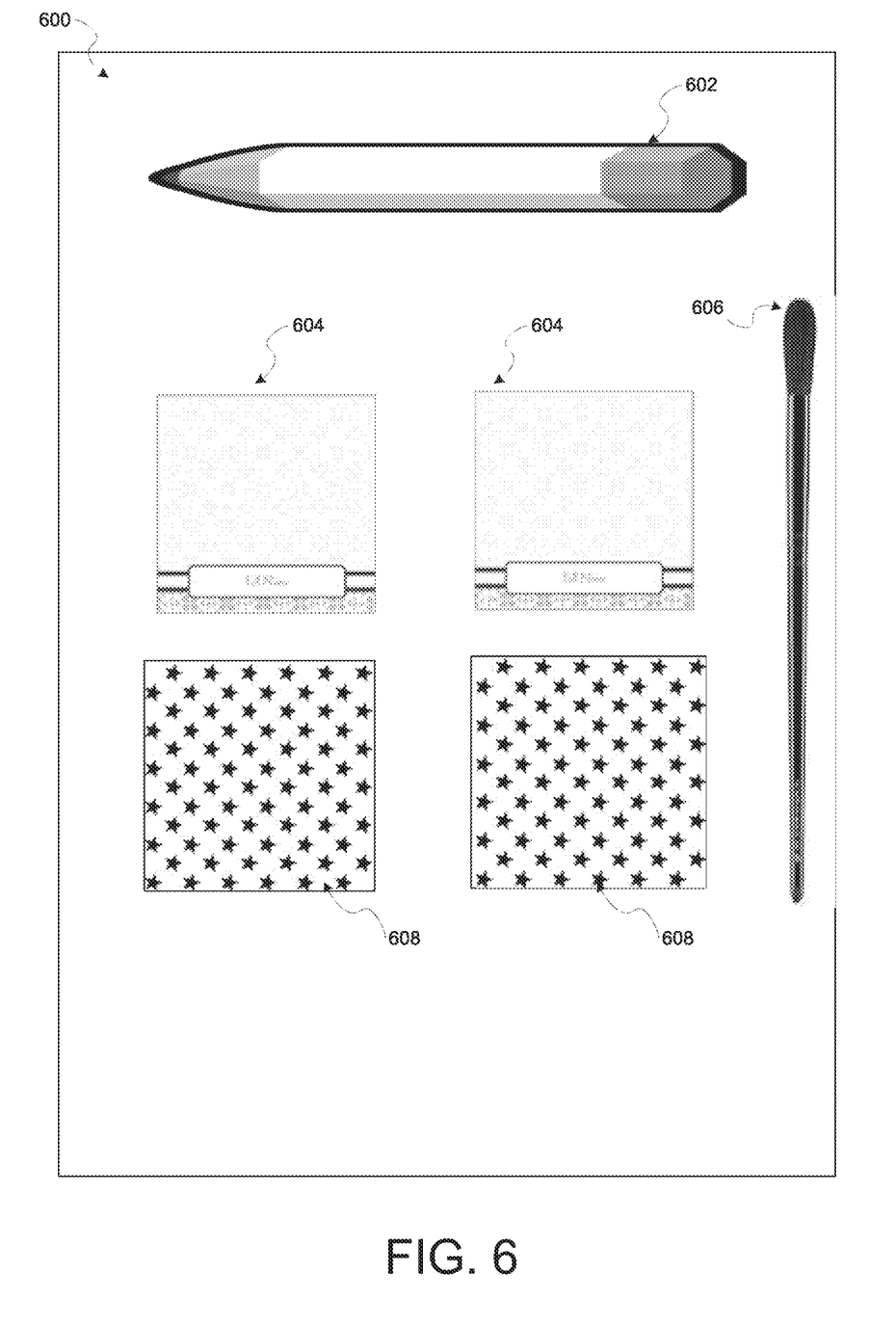
FIG. 6 illustrates an example alternative physical mockup of a webpage, used in some example embodiments.

Referring to FIG. 6, example physical layout 600 illustrates alternative means for generating a virtual webpage according to aspects of the present disclosure. In some example embodiments, various physical objects that have little to no visual resemblance to actual objects used in a webpage could still be used to represent those objects in the webpage. For example, physical layout 600 shows a pencil 602. An application according to aspects of the present disclosure may be programmed to recognize a pencil in a recorded image as some virtual object commonly used in a webpage layout. For example, the pencil 602 may be converted into a title bar or a menu bar when the recorded image of the pencil 602 is used to generate a webpage. As another example, the sticky notepads 604 may be recognized as another object for webpage generation according to aspects of the present disclosure. For example, the sticky notepads 604 may be converted into an image box or a text box. As another example, paintbrush 606 may be recognized as another object for webpage generation, such as a scroll bar. As another example, paper with star prints 608 may be recognized as another object for webpage generation, such as a different image box or text box. In general, in some example embodiments, real-world physical Objects that may not have any visual resemblance to objects in a webpage can still be recognized as representing certain objects to be generated in the webpage. In general, in some example embodiments, an application may be programmed and/or trained to recognize certain real-world physical objects and to associate those Objects with certain virtual objects in a webpage.

In some example embodiments, physical objects in the physical mockup may be simply hand-drawn. Aspects of the present disclosure may be programmed and/or trained to recognize hand-drawn or illustrated facsimiles of virtual objects and webpages.

Figure 7:
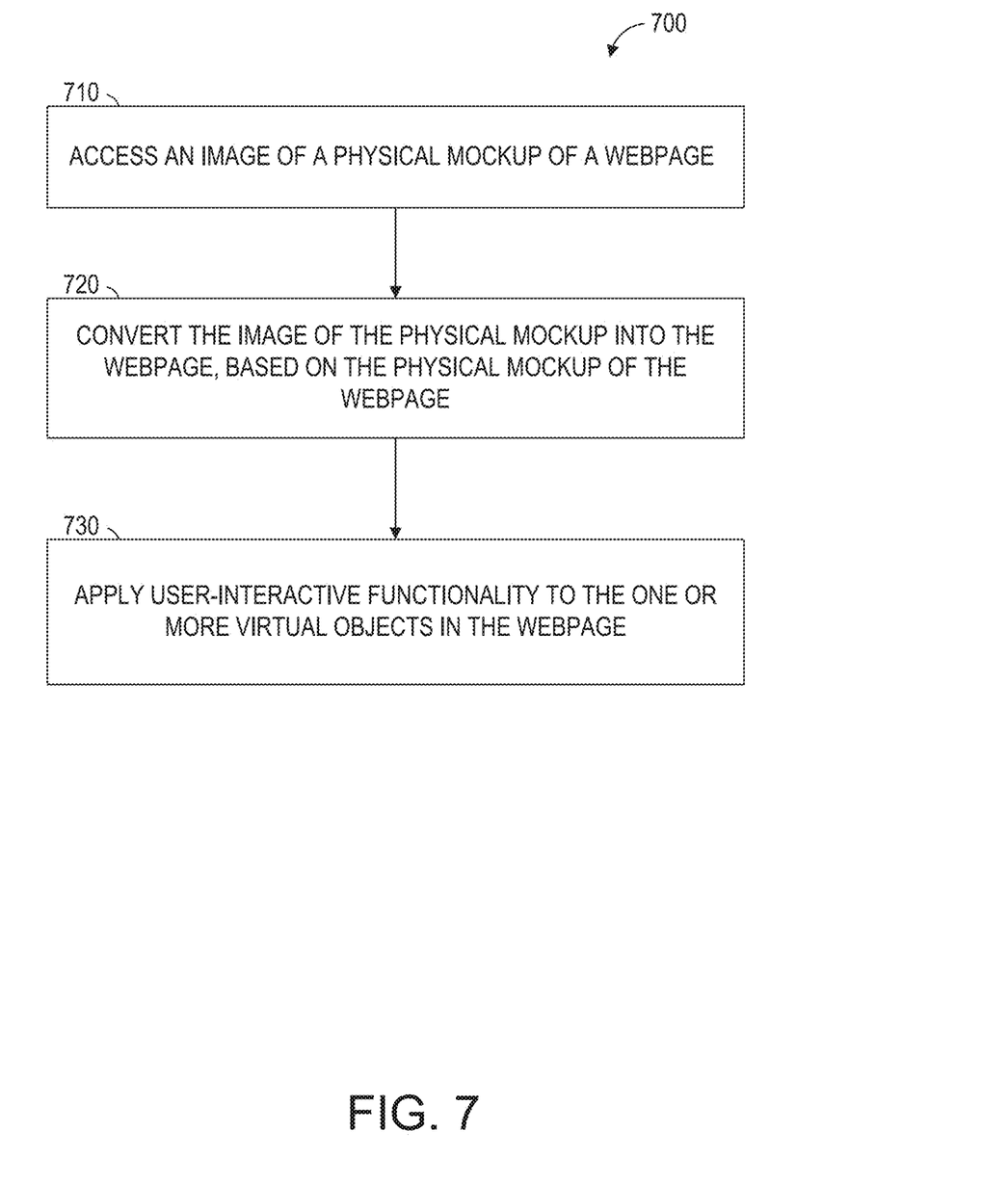
FIG. 7 is a flowchart illustrating example operations for generating a webpage, according to some example embodiments.

Referring to FIG. 7, the flowchart illustrates an example methodology 700 for generating a webpage according to aspects of the present disclosure. The example methodology may be consistent with the methods described herein, including, for example, the descriptions in FIGS. 3, 4, 5, and 6. At block 710, an application may access an image of a physical mockup of a webpage. The application may include a UI and may be consistent with the applications described herein, for example. The physical mockup of the webpage may include one or more physical Objects representative of one or more virtual objects in the webpage. Examples of physical objects include physical cutouts of objects resembling virtual objects in a webpage, magnetized mockups of virtual objects in a webpage, real-world objects that have little to no resemblance to the virtual objects typically found in a webpage, and even drawings made to look like or simply having visual indicators corresponding to virtual objects in a webpage. Examples of virtual objects in a webpage may include menu bars, title bars, image boxes, text boxes, scroll bars, buttons, and the like. Other examples of these descriptions may be apparent to those having skill in the art, and embodiments are not so limited.

At block 720, an application may convert the image into the webpage, based on the physical mockup of the webpage. The webpage may include the one or more virtual objects arranged in a layout corresponding to positions of the one or more physical objects in the physical mockup. At block 730, the application may apply user-interactive functionality to the one or more virtual objects in the webpage. The user-interactive functionality may be based on one or more visual indicators on the one or more physical objects identifiable in the image. The user-interactive functionality may correspond to typical functionality found in a webpage, such as being able to click to links, scrolling, typing in text boxes, adding images to image boxes, adding drop down menus, and the like. The visual indicators may include particular colors, visual patterns, shapes, markings, key text, and the like. The application may be programmed to recognize the particular visual indicators and apply particular functionality to the particular virtual objects based on a correspondence of functionality to a particular visual indicator.

Figure 8:
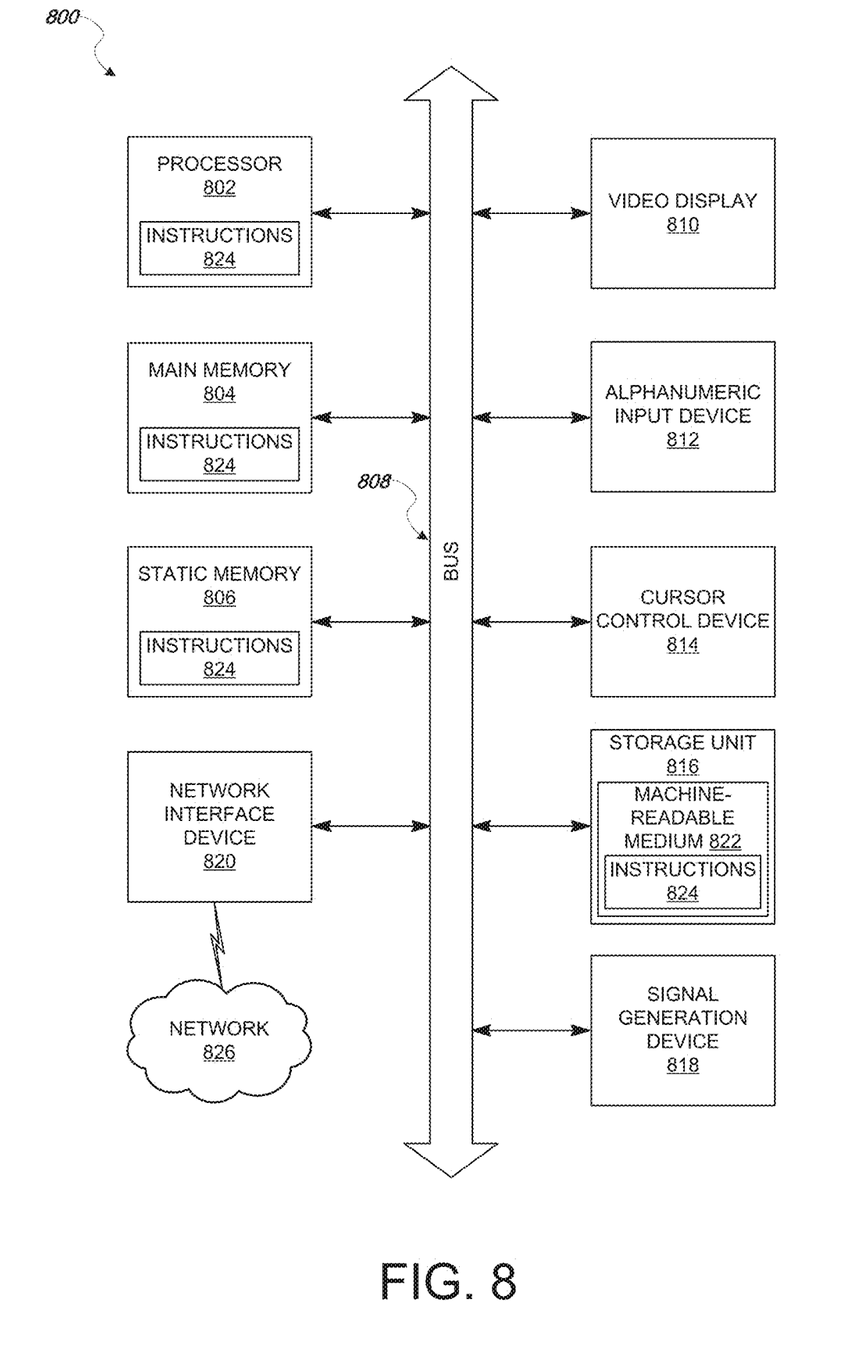
FIG. 8 is a block diagram illustrating components of a machine, according to some example embodiments, able to read instructions from a machine-readable medium and perform any one or more of the methodologies discussed herein.

Referring to FIG. 8, the block diagram illustrates components of machine 800, according to some example embodiments, able to read instructions 824 from a machine-readable medium 822 (e.g., a non-transitory machine-readable medium, a machine-readable storage medium, a computer-readable storage medium, or any suitable combination thereof) and perform any one or more of the methodologies discussed herein, in whole or in part. Specifically, FIG. 8 shows the machine 800 in the example form of a computer system (e.g., a computer) within which the instructions 824 (e.g., software, a program, an application, an applet, an app, or other executable code) for causing the machine 800 to perform any one or more of the methodologies discussed herein may be executed, in whole or in part.

In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a distributed (e.g., peer-to-peer) network environment. The machine 800 may include hardware, software, or combinations thereof, and may as examples be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include any collection of machines that individually or jointly execute the instructions 824 to perform all or part of any one or more of the methodologies discussed herein.

The machine 800 includes a processor 802 (e.g., a central processing unit (CRU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a video display 810 (e.g., a plasma display panel (PDP), a light emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a cursor control device 814 (e.g., a mouse, a touchpad, a trackball, a joystick, a motion sensor, an eye tracking device, or other pointing instrument), a storage unit 816, a signal generation device 818 (e.g., a sound card, an amplifier, a speaker, a headphone jack, or any suitable combination thereof), and a network interface device 820.

The storage unit 816 includes the machine-readable medium 822 (e.g., a tangible and non-transitory machine-readable storage medium) on which are stored the instructions 824 embodying any one or more of the methodologies or functions described herein, including, for example, any of the descriptions of FIGS. 1, 2, 3, 4, 5, 6, and/or 7. The instructions 824 may also reside, completely or at least partially, within the main memory 804, within the processor 802 (e.g., within the processor's cache memory), or both, before or during execution thereof by the machine 890. The instructions may also reside in the static memory 806.

Accordingly, the main memory 804 and the processor 802 may be considered machine-readable media (e.g., tangible and non-transitory machine-readable media). The instructions 824 may be transmitted or received over a network 826 via the network interface device 820. For example, the network interface device 820 may communicate the instructions 824 using any one or more transfer protocols (e.g., hypertext transfer protocol (HTTP)). The machine 800 may also represent example means for performing any of the functions described herein, including the processes described in FIGS. 1, 2, 3, 4, 5, 6, and/or 7.

In some example embodiments, the machine 800 may be a portable computing device, such as a smart phone or tablet computer, and have one or more additional input components (e.g., sensors or gauges), not shown. Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 shown in an example embodiment to be a single medium, the term "machine-readable medium" should be taken to include a single medium or multiple media (e.g., a centralized or distributed database, or associated caches and servers) able to store instructions 824. The term "machine-readable medium" shall also be taken to include any medium, or combination of multiple media, that is capable of storing the instructions 824 for execution by the machine 800, such that the instructions 824, when executed by one or more processors of the machine 800 (e.g., processor 802), cause the machine 800 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API).

The performance of certain operations may be distributed among the one or more processors, not only residing within a single machine, but deployed across a number of machines. In some example embodiments, the one or more processors or processor-implemented modules may be located in a single geographic location e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods, machine-readable media, and systems (e.g., apparatus) discussed herein:

1. A computer implemented method comprising:
accessing an image of a physical mockup of a webpage, the physical mockup of the webpage including one or more physical objects representative of one or more virtual objects in the webpage;
converting the image into the webpage, based on the physical mockup of the webpage, the webpage including the one or more virtual objects arranged in a layout corresponding to positions of the one or more physical objects in the physical mockup; and applying user-interactive functionality to the one or more virtual objects in the webpage, based on one or more visual indicators on the one or more physical objects identifiable in the image.

2. The method of description 1, wherein the one or more physical objects include physical cutouts representative of at least one of: a menu bar, a text box, an image box, and a scroll bar.

3. The method of description 1, wherein the one or more physical objects include magnetized objects representative of at least one of: a menu bar, a text box, an image box, and a scroll bar.

4. The method of description 1, wherein the one or more visual indicators includes one or more color patterns on the one or more physical objects, wherein each different color pattern of the one or more color patterns corresponds to a different user-interactive functionality to the one or more virtual objects.

5. The method of description 1, wherein the one or more visual indicators includes one or more different shapes associated with the one or more physical objects, wherein each of the one or more different shapes associated with the one or more physical objects corresponds to a different user-interactive functionality each associated with the one or more virtual objects.

6. The method of description 1, wherein converting the image into the webpage comprises:
visually recognizing the one or more physical objects in the image to correspond to one or more virtual objects; and
automatically generating the one or more virtual objects in the layout of the webpage, having positions in the layout of the webpage based on the positions of the physical objects in the image.

7. An apparatus comprising an input interface, an output interface, and at least one processor configured to perform any of the descriptions in descriptions 1 through 6.

8. A computer-readable medium embodying instructions that, when executed by a processor, perform operations comprising any of the descriptions in descriptions 1 through 6.

9. An apparatus comprising means for performing any of the descriptions in descriptions 1 through 6.

What is claimed is:

1. A method comprising:
capturing, by a camera of a device, an image of a physical webpage mockup, the physical webpage mockup including at least a first physical object and a second physical object, the first physical object including a first visual indicator and the second physical object including a second visual indicator, the first visual indicator being different than the second visual indicator;
storing, in a memory of the device, the image of the physical webpage mockup;
accessing, from the memory of the device, the image of the physical webpage mockup;
determining, based on the first visual indicator, a first virtual object represented by the first physical object;
determining, based on the second visual indicator, a second virtual object represented by the second physical object, wherein the first virtual object and the second virtual object are visually presentable user interface elements;
converting the physical webpage mockup captured in the image into a webpage based on the first physical object and the second physical object included in the image of the physical webpage mockup, the webpage including the first virtual object represented by the first physical object and the second virtual object represented by the second physical object, the first virtual object and the second virtual object arranged in the webpage in a layout corresponding to positions of the first physical object and the second physical object in the physical webpage mockup;
searching, based on the first visual indicator and the second visual indicator, a database of predetermined visual indicators and corresponding interactive functions, yielding a search;
determining, based on the search, that the first visual indicator corresponds to a first user interactive function, and the second visual indicator corresponds to a second user interactive function that is different than the first user interactive function; and
applying the first user interactive function to the first virtual object in the webpage, and the second user interactive function to the second virtual object in the webpage.

2. The method of claim 1, wherein the first physical object is a physical cutout representative of at least one of:
a menu bar, a text box, an image box, or a scroll bar.

3. The method of claim 1, wherein the first physical object is a magnetized object representative of at least one of:
a menu bar, a text box, an image box, or a scroll bar.

4. The method of claim 1, wherein the first visual indicator is a first color pattern on the first physical object, and the second visual indicator is a second color pattern on the second physical object.

5. The method of claim 1, wherein the first visual indicator is a first shape associated with the first physical object, and the second visual indicator is a second shape associated with the second physical object.

6. The method of claim 1, wherein converting the image into the webpage comprises:
visually recognizing the first physical object and the second physical object in the image as corresponding to the first virtual object and the second virtual object; and
automatically generating the first virtual object and the second virtual object in the layout of the webpage, the first virtual object and the second virtual object having positions in the layout of the webpage based on the positions of the first physical object and the second physical object in the image.

7. A computing device comprising:
one or more computer processors; and
one or more computer-readable mediums storing instructions that, when executed by the one or more computer processors, cause the computing device to perform operations comprising:
capturing, by a camera of the computing device, an image of a physical webpage mockup, the physical webpage mockup including at least a first physical object and a second physical object, the first physical object including a first visual indicator and the second physical object including a second visual indicator, the first visual indicator being different than the second visual indicator;
storing the image of the physical webpage mockup;
accessing the image of the physical webpage mockup;
determining, based on the first visual indicator, a first virtual object represented by the first physical object;
determining, based on the second visual indicator, a second virtual object represented by the second physical object, wherein the first virtual object and the second virtual object are visually presentable user interface elements;

converting the physical webpage mockup captured in the image into a webpage based on the first physical object and the second physical object included in the image of the physical webpage mockup, the webpage including the first virtual object represented by the first physical object and the second virtual object represented by the second physical object, the first virtual object and the second virtual object arranged in the webpage in a layout corresponding to positions of the first physical object and the second physical object in the physical webpage mockup;

searching, based on the first visual indicator and the second visual indicator, a database of predetermined visual indicators and corresponding interactive functions, yielding a search;

determining, based on the search, that the first visual indicator corresponds to a first user interactive function, and the second visual indicator corresponds to a second user interactive function that is different than the first user interactive function; and applying the first user interactive function to the first virtual object in the webpage, and the second user interactive function to the second virtual object in the webpage.

8. The computing device of claim 7, wherein the first physical object is a physical cutout representative of at least one of:
a menu bar, a text box, an image box, or a scroll bar.

9. The computing device of claim 7, wherein the first physical object is a magnetized object representative of at least one of;
a menu bar, a text box, an image box, or a scroll bar.

10. The computing device of claim 7, wherein the first visual indicator is a first color pattern on the first physical object, and the second visual indicator is a second color pattern on the second physical object.

11. The computing device of claim 7, wherein the first visual indicator is a first shape associated with the first physical object, and the second visual indicator is a second shape associated with the second physical object.

12. The computing device of claim 7, wherein converting the image into the webpage comprises:
visually recognizing the first physical object and the second physical object in the image as corresponding to the first virtual object and the second virtual object; and
automatically generating the first virtual object and the second virtual object in the layout of the webpage, the first virtual object and the second virtual object having positions in the layout of the webpage based on the positions of the first physical object and the second physical object in the image.

13. A non-transitory computer-readable medium storing instructions that, when executed by one or more computer processors of a computing device, cause the computing device to perform operations comprising:
capturing, by a camera of the computing device, an image of a physical webpage mockup, the physical webpage mockup including at least a first physical object and a second physical object, the first physical object including a first visual indicator and the second physical object including a second visual indicator, the first visual indicator being different than the second visual indicator;
storing the image of the physical webpage mockup;
accessing the image of the physical webpage mockup;
determining, based on the first visual indicator, a first virtual object represented by the first physical object;
determining, based on the second visual indicator, a second virtual object represented by the second physical object, wherein the first virtual object and the second virtual object are visually presentable user interface elements;
converting the physical webpage mockup captured in the image into a webpage based on the first physical object and the second physical object included in the image of the physical webpage mockup, the webpage including the first virtual object represented by the first physical object and the second virtual object represented by the second physical object, the first virtual object and the second virtual object arranged in the webpage in a layout corresponding to positions of the first physical object and the second physical object in the physical webpage mockup;
searching, based on the first visual indicator and the second visual indicator, a database of predetermined visual indicators and corresponding interactive functions, yielding a search;
determining, based on the search, that the first visual indicator corresponds to a first user interactive function, and the second visual indicator corresponds to a second user interactive function that is different than the first user interactive function; and
applying the first user interactive function to the first virtual object in the webpage, and the second user interactive function to the second virtual object in the webpage.

14. The non-transitory computer-readable medium of claim 13, wherein the first physical object is a physical cutout representative of at least one of:
a menu bar, a text box, an image box, or a scroll bar.

15. The non-transitory computer-readable medium of claim 13, wherein the first physical object is a magnetized object representative of at least one of;
a menu bar, a text box, an image box, or a scroll bar.

16. The non-transitory computer-readable medium of claim 13, wherein the first visual indicator is a first color pattern on the first physical object, and the second visual indicator is a second color pattern on the second physical object.

17. The non-transitory computer-readable medium of claim 13, wherein the first visual indicator is a first shape associated with the first physical object, and the second visual indicator is a second shape associated with the second physical object.

18. The non-transitory computer-readable medium of claim 13, wherein converting the image into the webpage comprises:
visually recognizing the first physical object and the second physical object in the image as corresponding to the first virtual object and the second virtual object; and
automatically generating the first virtual object and the second virtual object in the layout of the webpage, the first virtual object and the second virtual object having positions in the layout of the webpage based on the positions of the first physical object and the second physical object in the image.

* * * * *